United States Patent
Guhl et al.

(10) Patent No.: US 11,059,316 B2
(45) Date of Patent: Jul. 13, 2021

(54) RELATION TO SECURITY PRINTING

(71) Applicant: Inovink Limited, Sheffield (GB)

(72) Inventors: Dieter Guhl, Stoke-on-Trent (GB);
Angus Robert Ward, Sheffield (GB);
David Andrew Bedford, Sheffield (GB)

(73) Assignee: INOVINK LIMITED, Sheffield (GB)

( * ) Notice: Subject to any disclaimer, the term of this patent is extended or adjusted under 35 U.S.C. 154(b) by 196 days.

(21) Appl. No.: 16/412,824

(22) Filed: May 15, 2019

(65) Prior Publication Data
US 2020/0094608 A1 Mar. 26, 2020

(30) Foreign Application Priority Data
Sep. 21, 2018 (GB) ...................... 1815403

(51) Int. Cl.
*B42D 25/29* (2014.01)
*C01G 41/00* (2006.01)
*C09D 11/50* (2014.01)
*B42D 25/373* (2014.01)
*B42D 25/30* (2014.01)

(52) U.S. Cl.
CPC .......... *B42D 25/29* (2014.10); *B42D 25/373* (2014.10); *C01G 41/006* (2013.01); *C09D 11/50* (2013.01); *B42D 25/30* (2014.10)

(58) Field of Classification Search
CPC ...... B42D 25/29; B42D 25/30; B42D 25/373; C09D 11/50
See application file for complete search history.

(56) References Cited

U.S. PATENT DOCUMENTS

2016/0243877 A1 8/2016 Lewis et al.

FOREIGN PATENT DOCUMENTS

| EP | 3409723 A1 | 12/2018 |
| JP | 2008208274 A | 9/2008 |
| JP | 2017095686 A | 6/2017 |
| WO | 2007091094 A1 | 8/2007 |
| WO | 2017217459 A1 | 12/2017 |
| WO | 2019021992 A1 | 1/2019 |

OTHER PUBLICATIONS

Machine Translation of WO 2007/091094.*
Machine Translation of WO 2019/021992.*
PCT International Search Report and Written Opinion for International Application No. PCT/GB2019/052615, dated Jan. 3, 2020, 10 pages.
Great Britain Search Report for Application No. GB1815403.9, dated Mar. 21, 2019, 3 pages.

* cited by examiner

*Primary Examiner* — Laura C Powers
(74) *Attorney, Agent, or Firm* — Hoffman Warnick LLC

(57) ABSTRACT

An article comprising a substrate which carries a material of formula (I)

$$M^1{}_a M^2{}_b W_c O_d (P(O)_n R_m)_e \qquad (I)$$

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group.

10 Claims, 7 Drawing Sheets

RELATION TO SECURITY PRINTING

The present invention relates to articles comprising a security feature and compositions and methods relating thereto.

The invention relates in particular to banknotes and to the use of infra-red absorbing pigments as a security feature on the banknotes.

According to a first aspect of the present invention there is provided an article comprising a substrate which carries a material of formula (I)

$$M^1_a M^2_b W_c O_d (P(O)_n R_m)_e \qquad (I)$$

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group.

The present invention relates to an article comprising a substrate which carries a material of formula (I).

The article may be selected from packaging, for example for pharmaceuticals; a label, for example for expensive or designer goods; an identification document, for example a passport, ID card or driving licence; a credit card or other bank card; a ticket or voucher, for example for events or travel; or a certificate, for example a share certificate or stamp certificate.

Most preferably the article is a banknote.

The article comprises a substrate. Preferably the substrate is a sheet substrate, preferably a planar sheet substrate. The substrate may be made from any suitable material. Suitable materials will be known to the person skilled in the art and include for example paper, cardboard, textiles and plastics materials.

In preferred embodiments in which the article is a banknote the substrate is selected from paper, a polymer or a mixture thereof. A preferred paper is banknote paper and preferred polymers include biaxially oriented polypropylene and extruded polypropylene. Other suitable papers and polymers will be known to the person skilled in the art.

The substrate carries a material of formula (I). By this we mean that the material of formula (I) is retained within or on the surface of the substrate. In some embodiments the material of formula (I) may be held within the body of the substrate, for example dispersed throughout the substrate. For example it may have been mixed within the raw ingredients used to make the substrate. In some embodiments the material of formula (I) may be incorporated in a thread woven into the substrate. In some embodiments the material of formula (I) may be in a coating on some or all of the substrate, on one or both planar surfaces of the substrate. In some embodiments the material of formula (I) may have been printed onto the substrate, on one or both planar surfaces of the substrate. In some embodiments the material of formula (I) may be incorporated only into one portion of the substrate. For example where a banknote includes a window, for example of a substantially transparent polymer, the material of formula (I) may only be present on the window portion or the non window portion.

Preferably the material of formula (I) is carried on the surface of the substrate. It may be present as a coating or a printed image. Suitably it may be printed in the form of a security image.

The present invention relates to the use of a material of formula $M^1_a M^2_b W_c O_d (P(O)_n R_m)_e$.

Each of $M^1$ and $M^2$ is suitably present as a cationic species. Each of $M^1$ and $M^2$ is selected from ammonium or a metal cation.

$M^1$ is preferably a metal cation selected from the group consisting of alkali metals, alkaline earth metals, group 13 metals, group 14 metals and first or second row d-block metals.

Preferably $M^1$ is selected from ammonium, alkali metals, zinc and tin. More preferably $M^1$ is selected from ammonium, potassium, sodium, caesium, rubidium, zinc and tin. Most preferably $M^1$ is an alkali metal, especially caesium.

$M^2$ is preferably a metal cation selected from the group consisting of alkali metals, alkaline earth metals, group 13 metals, group 14 metals and first or second row d-block metals.

Preferably $M^2$ is selected from alkali metals, alkaline earth metals, zinc and tin. More preferably $M^2$ is selected from alkali metals, zinc and tin. Most preferably $M^2$ is selected from sodium, potassium, zinc and tin.

$M^2$ may comprise a mixture of two or more metals.

Preferably $M^1$ is caesium and $M^2$ is not caesium.

Preferably $M^1$ is caesium and $M^2$ is selected from the group consisting of alkali metals, zinc and tin.

In one embodiment $M^1$ is caesium and $M^2$ is sodium.
In one embodiment $M^1$ is caesium and $M^2$ is zinc.
In one embodiment $M^1$ is caesium and $M^2$ is tin.
In one especially preferred embodiment $M^1$ is caesium and $M^2$ is potassium.

a is from 0.01 to 0.5. Preferably a is from 0.1 to 0.45. Most preferably a is from 0.22 to 0.4.

b is from 0 to 0.5. Preferably b is from 0.001 to 0.4, or from 0.005 to 0.3. Suitably from 0.0075 to 0.25, for example from 0.01 to 0.2.

The sum of a and b is preferably from 0.1 to 0.6, preferably from 0.2 to 0.4, more preferably from 0.3 to 0.35.

d is from 2.5 to 3. Preferably d is from 2.6 to 3. Most preferably d is from 2.7 to 3.

e is 0.01 to 0.75.

Preferably e is from 0.01 to 5, more preferably from 0.02 to 0.4, suitably from 0.03 to 0.4, for example from 0.05 to 0.25.

In one preferred embodiment e is from 0.06 to 0.1.

n may be 1, 2 or 3.

Preferably n is 2 or 3. Most preferably n is 3.

m may be 1, 2 or 3.

Preferably m is 1 or 2. Most preferably m is 1.

When m is more than 1 each R may be the same or different. References herein to R apply independently to each R in such embodiments. However in preferred embodiments each R is the same.

R is an optionally substituted hydrocarbyl group.

Preferably R is an optionally substituted alkyl, alkenyl, aryl, aralkyl, alkaryl group or an alkoxy containing group.

Preferably R is an unsubstituted alkyl, alkenyl, aryl, aralkyl or alkaryl group or an alkoxy containing group. Preferably R is selected from alkyl groups, aryl groups, aralkyl groups and alkoxy or phenoxy containing groups.

Suitable alkoxy containing groups include alkoxylated alkyl groups, polyalkoxylated alkyl groups, alkoxylated alcohols and polyalkoxylated alcohols.

Preferred alkoxy containing groups are polyalkoxylated alcohols especially moieties derived from ethylene oxide and/or propylene oxide. Especially preferred alkoxy containing groups are polyethylene glycol (PEG) or polypropylene glycol (PPG) groups having a number average molecular weight from 50 to 2500, more preferably from 50 to 1000, most preferably from 50 to 400.

In some embodiments R is an aryl group. Suitable aryl groups may comprise one or more aromatic rings. In some embodiments R may be naphthyl.

Suitable aryl groups include heterocyclic aryl groups. Preferred aryl groups have 5 to 7 carbon atoms and optionally contain one or more heteroatoms for example N, S or O.

Preferred aryl groups are phenyl and substituted phenyl groups.

In some embodiments R may be OAr where Ar is an aryl group. For example R may be phenoxy.

Suitable substituents include one or more alkyl and/or alkoxy containing groups. Preferred substituents include methyl, ethyl, propyl, butyl, pentyl, hexyl, heptyl, octyl, nonayl, and isomers thereof; derivatives of poly(isoprene) and poly(isobutylene) and polyalkoxylated alcohols especially moieties derived from ethylene oxide and/or propylene oxide. Some preferred substituents when R is phenyl are isohexyl, isoheptyl and isononyl.

In some embodiments R may be toluol or xylol.

In some embodiments R is an unsubstituted aryl group. In one preferred embodiment R is phenyl.

In some embodiments R is an optionally substituted alkyl group.

Suitable substituents include halo, hydroxy, nitro, amino and alkoxy.

Preferred alkyl groups are unsubstituted.

Suitably R is an unsubstituted linear or branched alkyl group.

Suitably R is selected from an alkoxy group, a phenoxy group or an alkyl or aryl group having 1 to 36 carbon atoms.

Preferably R is an alkyl or aryl group having 1 to 36 carbon atoms, preferably 2 to 30 carbon atoms, more preferably 4 to 24 carbon atoms, suitably 6 to 20 carbon atoms.

In some embodiments R is an unsubstituted alkyl or aryl group having 4 to 24 carbon atoms.

In some embodiments R is an unsubstituted alkyl group having 8 to 18 carbon atoms.

In one preferred embodiment R is $C_8H_{17}$.

In one preferred embodiment R is $C_{18}H_{37}$.

Most preferably R is selected from octyl, octadecyl and phenyl.

Phosphorus may be present in a +3 or +5 oxidation state. Most preferably phosphorus is present in a +5 oxidation state.

Preferably $M^1$ is caesium; $M^2$ is selected from alkali metals, tin or zinc; a is 0.1 to 0.45; b is 0 to 0.3; c is 1; d is 2.7 to 3; e is 0.01 to 0.4; n is 2 or 3; m is 1 or 2 and each R is an unsubstituted alkyl or aryl group or an alkoxy group having 1 to 30 carbon atoms.

In some preferred embodiments, $M^1$ is caesium; $M^2$ is selected from sodium, potassium, tin or zinc; a is 0.22 to 0.4; b is 0.01 to 0.2; c is 1; d is 2.7 to 3; e is 0.05 to 0.25; n is 2; m is 1 and R is an unsubstituted alkyl or aryl group having 6 to 20 carbon atoms.

In one preferred embodiment, $M^1$ is caesium; $M^2$ is potassium; a is 0.32; b is 0.01; c is 1; d is 2.9; e is 0.08; n is 2; m is 1 and R is $C_8H_{17}$. Thus the material of formula (I) may be $Cs_{0.32}K_{0.01}WO_{2.9}(P(O_2)C_8H_{17})_{0.08}$.

In one embodiment, $M^1$ is caesium; $M^2$ is potassium; a is 0.32; b is 0.01; c is 1; d is 2.9; e is 0.16; n is 2; m is 1 and R is phenyl. Thus the material of formula (I) may be $Cs_{0.32}K_{0.01}WO_{2.9}(P(O_2)C_6H_5)_{0.16}$.

In one embodiment, $M^1$ is caesium; $M^2$ is potassium; a is 0.27; b is 0.05; c is 1; d is 2.9; e is 0.2; n is 2; m is 1 and R is $O_{18}H_{37}$. Thus the material of formula (I) may be $Cs_{0.27}K_{0.05}WO_{2.9}(P(O_2)C_{18}H_{37})_{0.2}$.

In one embodiment, $M^1$ is caesium; $M^2$ is sodium; a is 0.32; b is 0.01; c is 1; d is 3; e is 0.2; n is 2; m is 1 and R is $C_{18}H_{37}$. Thus the material of formula (I) may be $Cs_{0.32}Na_{0.01}WO_3(P(O_2)O_{18}H_{37})_{0.2}$.

In one embodiment, $M^1$ is caesium; $M^2$ is tin; a is 0.22; b is 0.1; c is 1; d is 2.9; e is 0.16; n is 2; m is 1 and R is $C_{18}H_{37}$. Thus the material of formula (I) may be $Cs_{0.22}Sn_{0.1}WO_{2.9}(P(O_2)C_{18}H_{37})_{0.16}$.

In one embodiment, $M^1$ is caesium; $M^2$ is zinc; a is 0.12; b is 0.2; c is 1; d is 3; e is 0.16; n is 2; m is 1 and R is phenyl. Thus the material of formula (I) may be $Cs_{0.12}Zn_{0.2}WO_3(P(O_2)C_6H_5)_{0.16}$.

In some embodiments, b is 0 such that the material of formula (I) does not comprise $M^2$. In such embodiments $M^1$ is caesium, a is 0.22 to 0.4; b is 0; c is 1; d is 2.7 to 3; e is 0.05 to 0.25; n is 2; m is 1 and R is an unsubstituted alkyl or aryl group having 6 to 20 carbon atoms.

In one embodiment, $M^1$ is caesium; a is 0.32; b is 0; c is 1; d is 2.72; e is 0.08; n is 2; m is 1 and R is $C_{18}H_{37}$. Thus the material of formula (I) may be $Cs_{0.32}WO_{2.72}(P(O_2)C_8H_{17})_{0.08}$.

In one embodiment, $M^1$ is caesium; a is 0.31; b is 0; c is 1; d is 2.9; e is 0.16; n is 2; m is 1 and R is phenyl. Thus the material of formula (I) may be $Cs_{0.31}WO_{2.9}(P(O_2)C_6H_5)_{0.16}$.

The present invention relates to a tungsten oxide based material. In preferred embodiments the material includes an organophosphorus moiety of formula W—O—P—OR or W—O—P—R.

By a moiety of formula W—O—P—OR or W—O—P—R, we mean that in the material of formula (I) includes a unit in which an oxygen atom which is coordinated to a tungsten atom in the crystal structure is also coordinated to a phosphorus atom, and this phosphorus atom is bonded either directly or via an oxygen atom to an optionally substituted hydrocarbyl group R.

In some embodiments the material of formula (I) is present in a coating on the surface of the substrate. The coating may be provided in the form of an ink, varnish or as a polymeric film.

The present invention may provide a polymer composition comprising a material of formula (I).

The polymer composition may comprise a polymer melt or pellets of polymer.

In some embodiments the material of formula (I) forms a printed image or coating on the substrate.

According to a second aspect of the present invention there is provided an ink composition comprising a material of formula (I)

$$M^1{}_a M^2{}_b W_c O_d (P(O)_n R_m)_e \qquad (I)$$

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group.

The material of formula (I) is suitably as defined in relation to the first aspect. The ink composition is suitably a solution or suspension comprising material of formula (I) and one or more further components.

The material of formula (I) is suitably incorporated into the ink composition in the form of a powder. In some embodiments the powder has an average particle size of less than 1 micron.

In some embodiments the material of formula (I) is suitably incorporated into the ink composition in the form of nanoparticles. Nanoparticles are suitably particles which have one or more dimensions of the order of 100 nm or less. Particle size may be measured by any suitable method. For example, any of the methods described in PAS 71:2005 published by British Standards could be used. Preferred methods for the determination of particle size include TEM (Transmission Electron Microscopy, when particles are made of a material that has high contrast with a carbon TEM grid), SEM (Scanning Electron Microscopy) and AFM (Atomic Force Microscopy). If the particles show plasmon resonance then the size can also be determined from the peak in the UV-VIS spectrum. For larger particles having a size of order of magnitude of $10^{-8}$ m or greater, light scattering can be used.

In some preferred embodiments the material of formula (I) has a volume-based median particle diameter ($d_{50}$ where $d_{50}$ is defined as the diameter where 50% of the total volume of particles has a diameter less than $d_{50}$; also referred to herein as median particle diameter) of approximately 1 micron.

A particular advantage of the material of formula (I) is that it can be directly incorporated into an ink composition in neat solid form. Suitably nanoparticles can be directly incorporated into an ink composition.

In some embodiments the ink composition may further comprise a dispersing aid. Suitable dispersing aids will be known to the person skilled in the art. Preferred dispersing aids for use herein are polymeric dispersants. Polyester derived dispersants are particularly preferred.

In some embodiments the ink composition may be an aqueous composition. In some embodiments the ink composition may be an oleophilic composition. In some embodiments the ink composition may be a solvent based composition.

The selection of an aqueous based ink composition or an oleophilic based ink composition depends on how the ink is intended to be applied to the substrate. The choice of a suitable base ink composition will be within the competence of the person skilled in the art.

The base ink composition may be suitable for any type of printing, for example offset printing (both lithographic and gravure), intaglio printing, letterpress printing, ink-jet printing and screen printing.

Aqueous ink compositions are typically used in screen printing and inkjet printing.

Oleophilic compositions are preferred for offset printing (including lithographic and gravure printing), intaglio printing and letterpress printing. They can also be used in inkjet printing.

In inkjet printing the ink composition may have an organic solvent base. Suitable organic solvents include acetone and other ketones, for example methyl ethyl ketone.

For some applications monomer based inks may be used, for example acrylic inks.

Rubber based inks may be used in lithographic, offset, letterpress and screen printing.

In preferred embodiments the ink composition of the present invention is an oleophilic composition.

When the composition is an oleophilic composition the major component of the ink may be an oil, for example linseed oil. Other components typically present in printing inks will be known to the person skilled in the art.

The material of formula (I) is preferably present in the ink composition in an amount of at least 0.1 wt %, preferably at least 1 wt %, more preferably at least 2 wt %, suitably at least 5 wt %.

The material of formula (I) may be present in a composition in an amount of up to 50 wt %, suitably up to 40 wt %, for example up to 30 wt % or up to 25 wt %.

The ink composition may comprise one or more further components for example varnishes, cosolvents, preservatives, drying agents, fragrances, thickeners, waxes and emulsifiers. Other suitable components will be known to the person skilled in the art.

In some embodiments the ink composition may comprise one or more further pigments and/or dyes.

In some embodiments there may be no further pigments or dyes present in the composition.

Figure 1:
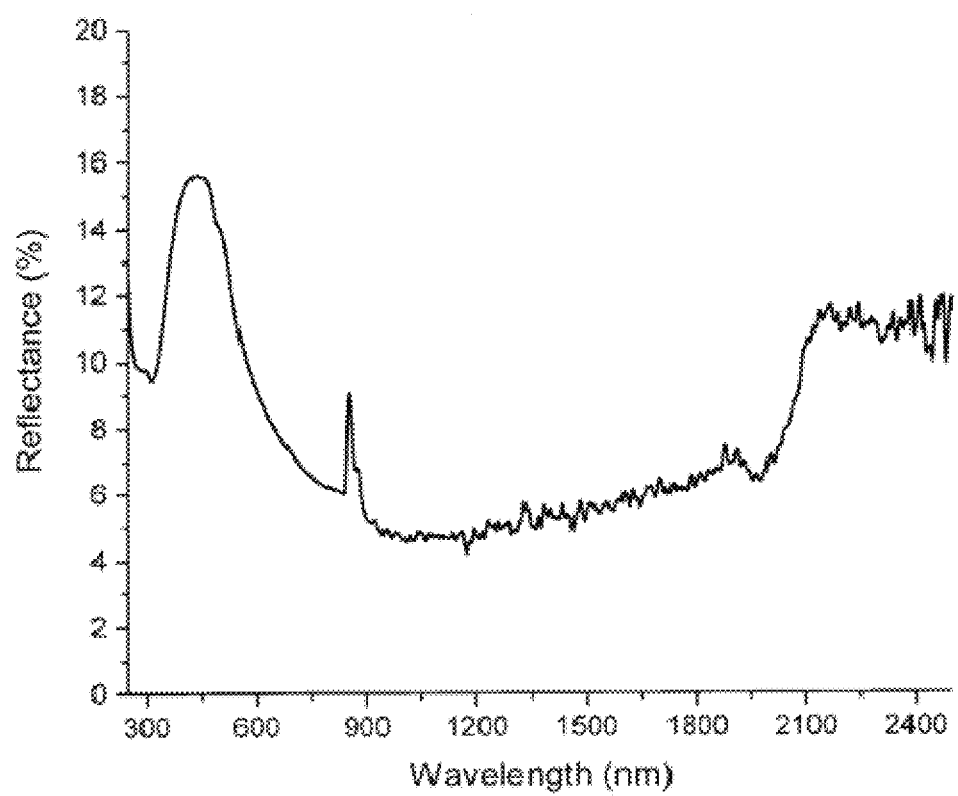
FIG. 1 shows the spectra of the powder reflectance of a material according to an embodiment of the invention.

The material of formula (I) used in all aspects of the present invention may be prepared by any suitable means.

Suitable the method involves the steps of:
(i) admixing:
  (a) a source of dopant species $M^1$ and optionally $M^2$;
  (b) a source of tungsten;
(ii) adding (c) an organophosphorus compound; and
(iii) heating a mixture of (a), (b) and optionally (c) in a reducing atmosphere.

Step (i) involves admixing a source of dopant species $M^1/M^2$ (a) and a source of tungsten (b).

When metals $M^1$ and $M^2$ are both used these may be each provided from the same source or a different source. Thus in some embodiments component (a) may comprise a mixture of compounds.

Step (ii) involves adding an organophosphorus compound (c).

In some embodiments steps (i) and (ii) may be combined and the method may involve admixing components (a), (b) and (c).

In some embodiments steps (i) and (ii) may be carried out separately and the source of dopant species $M^1/M^2$ (a) and source of tungsten (b) are admixed first and then further mixed with an organic phosphorus compound (c) before or after being heated in a reducing atmosphere.

In some embodiments step (ii) is carried out before step (iii) and step (iii) involves heating a mixture of a source of dopant species $M^1/M^2$ (a); a source of tungsten (b) and an organophosphorus compound (c) in a reducing atmosphere.

In some embodiments step (iii) is carried out before step (ii). In such embodiments step (iii) involves heating a mixture of a source of dopant species $M^1/M^2$ (a) and a source of tungsten (b) in a reducing atmosphere and step (ii) involves adding an organophosphorus compound (c) to this reduced mixture.

Suitably the source of dopant species $M^1/M^2$ comprises a salt comprising a cationic species $M^1/M^2$ and an anion. Suitable salts include halides, nitrites, nitrates, sulfates, hydroxides, carbonates and oxides. Preferably the source of dopant species $M^1/M^2$ is a carbonate, hydroxide or nitrate.

In preferred embodiments when $M^1$ is caesium, the source of dopant species $M^1$ will suitably be a caesium source. Preferred caesium sources include caesium carbonate, caesium hydroxide, and caesium nitrate.

In some embodiments component (a) may comprise a mixture of two or more sources of dopant species $M^1/M^2$. In such embodiments component (a) may comprise a mixture of two or more different salts of the same species $M^1/M^2$ and/or salts comprising different species $M^1/M^2$.

Any compound comprising tungsten may be used as the source of tungsten (b). Preferred sources of tungsten include sodium tungstate, tungstic acid and ammonium metatungstate.

Component (b) may comprises a mixture of two or more sources of tungsten.

The ratio of component (a) and component (b) used in step (i) is determined by the desired molar ratio in the material of formula (I).

Typically the molar ratio of dopant species $M^1/M^2$ to tungsten is from 1:2 to 1:4, preferably approximately 1:3. The selection of an appropriate ratio of starting materials is within the competence of the person skilled in the art.

In preferred embodiments step (i) is carried out in a solvent. Preferred solvents include water, water miscible alcohols, and mixtures thereof. Especially preferred solvents are water, methanol, ethanol, propanol, isopropanol, butanol and mixtures thereof.

In preferred embodiments in which steps (i) and (ii) are carried out simultaneously, this combined step is preferably carried out in the presence of such a solvent.

Step (ii) involves the addition of (c) an organophosphorus compound.

Any organophosphorus compound can be used. By organophosphorus compound we mean a compound which includes a phosphorus atom and a hydrocarbyl group in which a carbon atom is bonded either directly or via an oxygen atom to the phosphorus atom.

Suitable organophosphorus compounds include hydrocarbyl phosphines, phosphate and phosphonate esters.

Preferred organophosphorus compounds are compounds of formula (II):

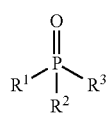

(II)

in which each of $R^1$, $R^2$ and $R^3$ is independently selected from OH, H, $OR^4$, alkyl, aryl and $(OR^5)_n OH$; wherein $R^4$ is alkyl or aryl; each $R^5$ is independently ethyl or propyl; and n is at least 1.

Preferably each of $R^1$, $R^2$ and $R^3$ is independently selected from OH, $OR^4$, alkyl and aryl.

Preferably $R^1$ is OH, $R^2$ is OH and $R^3$ is a group R as defined in relation to the first aspect.

Most preferably $R^1$ is OH, $R^2$ is OH and $R^3$ is selected from $C_8H_{17}$, $C_{18}H_{37}$ and phenyl.

Preferred organophosphorus compounds for use herein include octyl phosphonic acid, methylphosphonic acid dimethylester, tristearylphosphate, phenyl phosphate and triphenyl phosphate and polyethylene glycol monooleyl ether phosphate.

In one embodiment the source of dopant species $M^1/M^2$ (a) and the source of tungsten (b) are pre-mixed in step (i) and the source of organophosphorus (b) is added to this mixture in step (ii).

Step (i) may be carried out at ambient temperature or at elevated temperatures. In some embodiments step (i) may be carried out at temperatures above 50° C., for example 60° C. or 70° C. In some embodiments step (i) may be carried out at 80° C.

In embodiments in which step (ii) is carried out before step (iii) it may be carried out at ambient temperature or at elevated temperatures. In some embodiments step (ii) may be carried out at temperatures above 50° C., for example 60° C. or 70° C. In some embodiments step (ii) may be carried out at 80° C.

Steps (i) and/or (ii) suitably involve agitation the mixture formed.

Preferably any solvent is removed prior to step (iii). Preferably there is a step of drying the material before step (iii). Suitable methods of drying will be known to the person skilled in the art and include, for example, the use of a spray drier.

Step (iii) involves heating a mixture of (a), (b) and optionally (c) in a reducing atmosphere.

Suitably step (iii) involves heating a mixture of (a), (b) and optionally (c) in a reducing atmosphere at temperatures in excess of 300° C., suitably in excess of 400° C., preferably in excess of 450° C., for example at temperatures of 500 to 600° C.

Step (iii) suitably involves heating a mixture of (a), (b) and optionally (c) in a gaseous environment comprising hydrogen, nitrogen, carbon monoxide or mixture thereof. In preferred embodiments step (iii) involves heating a mixture of (a), (b) and optionally (c) in a nitrogen/hydrogen atmosphere.

In preferred embodiments step (iii) is carried out after step (ii) and involves heating a mixture comprising a source of dopant species $M^1/M^2$ (a), a source of tungsten (b) and an organophosphorus compound (c).

In some embodiments step (iii) is carried out before step (ii) and involves heating a mixture comprising a source of dopant species $M^1/M^2$ (a) and a source of tungsten (b). In such embodiments the reduced mixture is then admixed with an organophosphorus compound (c).

The reduced mixture obtained after step (iii) is suitably mixed with an organophosphorus compound (c) in the presence of a solvent in step (ii). Preferred solvents include water, water miscible alcohols (especially methanol and ethanol), and mixtures thereof.

After step (ii) the product is suitably dried. In such embodiments the product may be optionally heated again in a reducing atmosphere. Preferred conditions are as described in relation to step (iii).

Embodiments in which step (iii) is carried out before step (ii) allow only low amounts of organophosphorus to be incorporated, whereas embodiments in which step (iii) is carried out after step (ii) allow an almost free variation of the W/P ratio in the final product.

The material obtained after step (iii) may be used directly or subjected to further treatment.

In some preferred embodiments the method may involve a further step (iv) of milling the material obtained in step (iii).

Preferred milling processes involve ball milling.

Suitably milling is carried out until a specific surface area/particle size is obtained.

In preferred embodiments the material is ball milled until a surface area of at least 20 m²/gram is obtained.

According to a third aspect of the present invention there is provided a method of manufacturing an article of the first aspect, the method comprising incorporating a material of formula (I) into or onto the substrate.

Preferred features of the third aspect are as defined in relation to the first and second aspects.

In some embodiments the method of the third aspect may include mixing the material of formula (I) into a raw ingredient used to make the substrate and then forming the substrate from the raw ingredient. For example the method of the third aspect may involve dosing particles of a material of formula (I) into a paper pulp or polymer pellets and then using the pulp or pellets to make the substrate.

In some preferred embodiments the method of the third aspect comprises applying an ink composition comprising material of formula (I) onto a surface of the substrate.

Thus the third aspect of the present invention suitably provides a method of manufacturing an article, preferably a banknote, the method comprising providing a substrate, preferably a substantially planar substrate, and applying to a surface of the substrate an ink composition comprising a material of formula (I)

$$M^1{}_aM^2{}_bW_cO_d(P(O)_nR_m)_e \quad (I)$$

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group.

In preferred embodiments the substrate is a planar substrate, preferably a banknote. The method of the third aspect may involve applying the ink composition to one or both surfaces of the substrate. The ink composition is suitably as defined in relation to the second aspect.

In some embodiments the ink composition may be coated onto the substrate by dipping, spraying, painting or rolling.

In some embodiments the material of formula (I) may be incorporated into a polymer melt composition or other composition which is painted, dipped or sprayed onto the substrate.

The third aspect of the present invention may comprise coating, spraying, dipping, painting or printing onto the surface of the substrate a composition comprising A material of formula (I).

In some embodiments the material of formula (I) may be coated onto one surface of the substrate. In some embodiments it may be coated onto both surfaces of a planar substrate. The ink composition may be applied to some or all of the surface or surfaces of the substrate. In some embodiments an image may be applied to the substrate using a printing technique.

In some preferred embodiments the method of the third aspect comprises printing a composition comprising a material of formula (I) onto a surface of the substrate.

Any suitable printing technique may be used, for example offset printing (both lithographic and gravure), intaglio printing, letterpress printing, ink-jet printing and screen printing. Preferably the composition is printed by intaglio printing.

Suitably the ink composition is coated or printed onto the substrate at a thickness of at least 1 micron. The thickness will depend on the printing technique used. For offset printing a thickness of 1 to 2 microns is typically used; for a varnish coating or gravure printing a thickness of 2 to 4 microns is preferred; and for intaglio printing a thickness of at least 5 microns, suitably about 8 microns and up to 40 or even up to 80 microns may be used.

The ink composition may be coated or printed onto one or both sides of the substrate.

In some embodiments the ink composition may be provided as an overcoat varnish.

The article of the first aspect of the present invention comprises a material of formula (I) incorporated within or, preferably, applied to the surface thereof. The material of formula (I) is suitably an absorber of infra-red radiation and thus the article absorbs infra-red radiation at the locus which carries the material of formula (I).

Suitably the inclusion of the material of formula (I) within or on the surface of the substrate does not substantially alter the colour of the substrate in the visible range.

Suitably the difference in colour between the substrate with and without the material of formula (I) (dE, also referred to as ΔE, dE* and ΔE*) is less than 4, preferably less than 2, more preferably less than 1. The skilled person will appreciate that a dE of less than 1 is generally considered to be imperceptible to the human eye.

Because the presence of the material of formula (I) does not substantially affect the colour of the substrate it may be used to provide a hidden or covert security feature.

In some embodiments the substrate may be printed with two paired inks. Suitably in such embodiments a first portion of the substrate is printed with a first ink composition and a second portion of the substrate is coated with a second ink composition wherein the second ink composition has all of the same components as the first ink composition except that it further comprises a material of formula (I).

Thus the paired inks are suitably identical except for the inclusion of the material of formula (I).

Suitably the colour difference dE between the first portion of the substrate printed with the first ink composition of the paired inks and the second portion of the substrate printed with the second ink composition of the paired inks is less than 4, the dE is less than 2, more preferably less than 1.

The article, especially when a banknote, may include one or more further security features, for example a UV image/phosphor, an NIR-absorbing image, a holographic feature, a watermark, a thread, a magnetic image, windows, a colour shift/colour change image or a microprinting feature. Further features will also be known to the person skilled in the art.

According to a fourth aspect of the present invention there is provided the use of a material of formula (I)

$$M^1{}_aM^2{}_bW_cO_d(P(O)_nR_m)_e \quad (I)$$

to provide a covert security image or a hidden coating on a banknote, wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group.

The materials of formula (I) for use in the invention are particularly advantageous for use as covert security features because they have high absorption in the infra-red region but low absorbance in the visible region of the electromagnetic spectrum. Thus the materials of formula (I) used in the invention suitably are not strongly coloured.

The variable infra-red absorption can be used in an authentication method.

According to a fifth aspect of the present invention there is provided a method of detecting a genuine article of the first aspect, the method comprising measuring at a locus on the article the absorption $A_1$ of radiation at a first wavelength $\lambda_1$.

Suitably the absorption $A_1$ of radiation at wavelength $\lambda_1$ is compared with a standard and if it matches the standard the article can be determined to be genuine.

In some embodiments the method may further involve measure at the locus on the article the absorption $A_2$ of radiation at a second wavelength $\lambda_2$, and calculating the ratio of $A_1$ to $A_2$ wherein $\lambda_1$ and $\lambda_2$ are in the infra-red range.

Suitably the ratio of $A_1$ to $A_2$ is compared with a standard and if it matches the standard the article can be determined to be genuine.

In some embodiments the method of the fifth aspect of the present invention may involve measuring the absorbance of radiation at more than two wavelengths. The measurement of further absorbancies allows further ratios to be calculated, providing a higher degree of certainty that an article is authentic.

Preferably the article of the first aspect is a banknote. Preferably it has a coating comprising material of formula (I) or is printed with an image comprising material of formula (I). Suitably the coating or image comprising the material of formula (I) is durable to heat, light, water, chemicals and mechanical impact, abrasion and wear and tear. Suitably the coating or image is durable to laundering and to UV light from sunlight.

However all banknotes and other articles will become worn over time, and the quality of the coating or image may deteriorate. As the absorption of the coating/image depends on the concentration of the material of formula (I) this may change as a banknote is worn. Thus measurement of the absorption at a locus of the banknote or other article may provide an indication of the quality of the article. The present invention may therefore provide a screening method to detect inferior banknotes or other articles.

According to a sixth aspect of the present invention there is provided a method of assessing the quality of an article of the first aspect, the method comprising measuring at a locus of the article which carries a material of formula (I), the absorption $A_1$ of at least one wavelength of $\lambda_1$ of radiation in the infra-red range and comparing the absorption with a known standard.

Suitably the method of the sixth aspect involves further measuring at the locus of the article which carries a coating or image comprising a material of formula (I), the absorption $A_2$ of a second wavelength $\lambda_2$ of radiation in the infra-red range, calculating the ratio of $A_1$ to $A_2$ and comparing this with a known standard.

The method of the sixth aspect may be used to provide an automatic screening method. For example the infra-red absorption $A_1$ and $A_2$ of banknotes can be measured and compared with a standard in an automated system. Banknotes which conform closely with the standard ratio can be redistributed whereas those on which the image has deteriorated can be withdrawn from circulation.

The invention will now be further described with reference to the following non-limiting examples. Examples 1 to 7 describe the synthesis of materials of formula (I).

EXAMPLE 1

A clean reactor is filled with 100 kg DI-water and 18 kg caesium carbonate are dissolved with stirring. After the dissolution 82 kg of ammonium metatungstate are added with stirring at room temperature. Finally 45 kg of diphenylphosphate are added with stirring. Stirring is continued for 3 hours. After 3 hours the solution has turned turbid and the resulting slurry is dried with a spray drier. The resulting powder is transferred into saggars and is heated in an electric kiln under a nitrogen/hydrogen atmosphere at 600° C. for 2 hours. The resulting deep blue powder is dispersed in 200 l of DI water and ball milled until a surface area of at least 20 $m^2/gr$ is reached.

The resulting dispersion is spray dried again and results in 86 kg of blue powder.

EXAMPLE 2

A clean reactor is filled with 100 kg DI-water and 18 kg caesium carbonate are dissolved with stirring. After the dissolution 82 kg of ammonium metatungstate are added with stirring at room temperature. Finally 22 kg of phenylphosphonic acid are added with stirring. Stirring is continued for 3 hours. After 3 hours the solution has turned turbid and the resulting slurry is dried with a spray drier. The resulting powder is transferred into saggars and is heated in an electric kiln under a nitrogen/hydrogen atmosphere at 600° C. for 2 hours. The resulting deep blue powder is dispersed in 200 l of DI water and ball milled until a surface area of at least 20 $m^2/gr$ is reached.

The resulting dispersion is spray dried again and results in 80 kg of blue powder.

EXAMPLE 3

A clean reactor is filled with 100 kg DI-water and 18 kg caesium carbonate are dissolved with stirring. After the dissolution 82 kg of ammonium metatungstate are added with stirring at room temperature. Finally 35 kg of methylphosphonic acid dimethylester, dissolved in methanol are added with stirring. Stirring is continued for 3 hours. After 3 hours the solution has turned turbid and the resulting slurry is dried with a spray drier. The resulting powder is transferred into saggars and is heated in an electric kiln under a nitrogen/hydrogen atmosphere at 600° C. for 2 hours. The resulting deep blue powder is dispersed in 200 l of DI water and ball milled until a surface area of at least 20 $m^2/gr$ is reached.

The resulting dispersion is spray dried again and results in 80 kg of blue powder.

EXAMPLE 4

A clean reactor is filled with 100 kg DI-water and 18 kg caesium carbonate are dissolved with stirring. After the dissolution 82 kg of ammonium metatungstate are added with stirring at room temperature. Finally 30 kg of 85% octylphosphonic acid dissolved in an water/ethanol mixture are added with stirring. Stirring is continued for 3 hours. After 3 hours the solution has turned turbid and the resulting slurry is dried with a spray drier. The resulting powder is transferred into saggars and is heated in an electric kiln under a nitrogen/hydrogen atmosphere at 600° C. for 2 hours. The resulting deep blue powder is dispersed in 200 l of DI water and ball milled until a surface area of at least 20 $m^2/gr$ is reached.

The resulting dispersion is spray dried again and results in 85 kg of blue powder.

EXAMPLE 5

A clean reactor is filled with 150 kg DI-water and 82 kg of tungstic acid are added with stirring at room temperature. 22 kg of caesium carbonate are added with stirring. Stirring is continued for 3 hours at elevated temperatures of 80° C. The turbid dispersion is filtered and the filter cake is dried at 105° C. for 16 hours. After cooling to room temperature the yellow orange powder is dispersed in water again and 26 kg of phenylphosphonic acid are added and the mixture is continued to be stirred another 5 hours. The dispersion is filtered again, the filter cake dried again at 105° C. for 16 hours. The dry filter cake is crushed and heated in an electric kiln under a nitrogen/hydrogen atmosphere at 500° C. for 4 hours. The resulting deep blue powder is dispersed in 200 l of DI water and ball milled until a surface area of at least 20 m²/gr is reached.

The resulting dispersion is spray dried and results in 98 kg of blue powder.

EXAMPLE 6

A clean reactor is filled with 150 kg DI-water and 82 kg of tungstic acid are added with stirring at room temperature. 22 kg of caesium hydroxide are added with stirring. Stirring is continued for 3 hours at elevated temperatures of 80° C. The turbid dispersion is filtered and the filter cake is dried at 105° C. for 16 hours. After cooling to room temperature the yellow orange powder is dispersed in water again and 30 kg of octylphosphonic acid in a water/ethanol mix are added and the mixture is continued to be stirred another 5 hours. The dispersion is filtered again, the filter cake dried again at 105° C. for 16 hours. The dry filter cake is crushed and heated in an electric kiln under a nitrogen/hydrogen atmosphere at 500° C. for 4 hours. The resulting deep blue powder is dispersed in 200 l of DI water and ball milled until a surface area of at least 20 m²/gr is reached.

The resulting dispersion is spray dried and results in 98 kg of blue powder.

EXAMPLE 7

A clean reactor is filled with 150 kg DI-water and 82 kg of tungstic acid are added with stirring at room temperature. 22 kg of caesium hydroxide are added with stirring. Stirring is continued for 3 hours at elevated temperatures of 80° C. The turbid dispersion is filtered and the filter cake is dried at 105° C. for 16 hours. After cooling to room temperature the yellow orange powder is dispersed in water again and 54 kg of distearylphosphate in ethanol are added and the mixture is continued to be stirred another 5 hours. The dispersion is filtered again, the filter cake dried again at 105° C. for 16 hours. The dry filter cake is crushed and heated in an electric kiln under a nitrogen/hydrogen atmosphere at 500° C. for 4 hours. The resulting deep blue powder is dispersed in 200 l of DI water and ball milled until a surface area of at least 20 m²/gr is reached.

The resulting dispersion is spray dried and results in 98 kg of blue powder.

EXAMPLE 8

The powder reflectance of the material of example 4 was recorded and is shown in FIG. 1. This spectrum shows that there is very little reflection in the range of 900-1800 nm, which means that there is a high absorption since there is no transmission in a powder sample.

EXAMPLE 9

The organophosphorus tungsten oxide compound of example 4 was incorporated into a printing ink and the effect on the infrared ray absorption tested.

The material of example 4 was compared with a standard commercially available caesium tungsten oxide of the prior art. The materials were blended at different levels into a non absorbing white base ink with the help of a speedmixer. The ready to use inks were applied via an orange proofer onto paper and polymer films.

Figure 2:
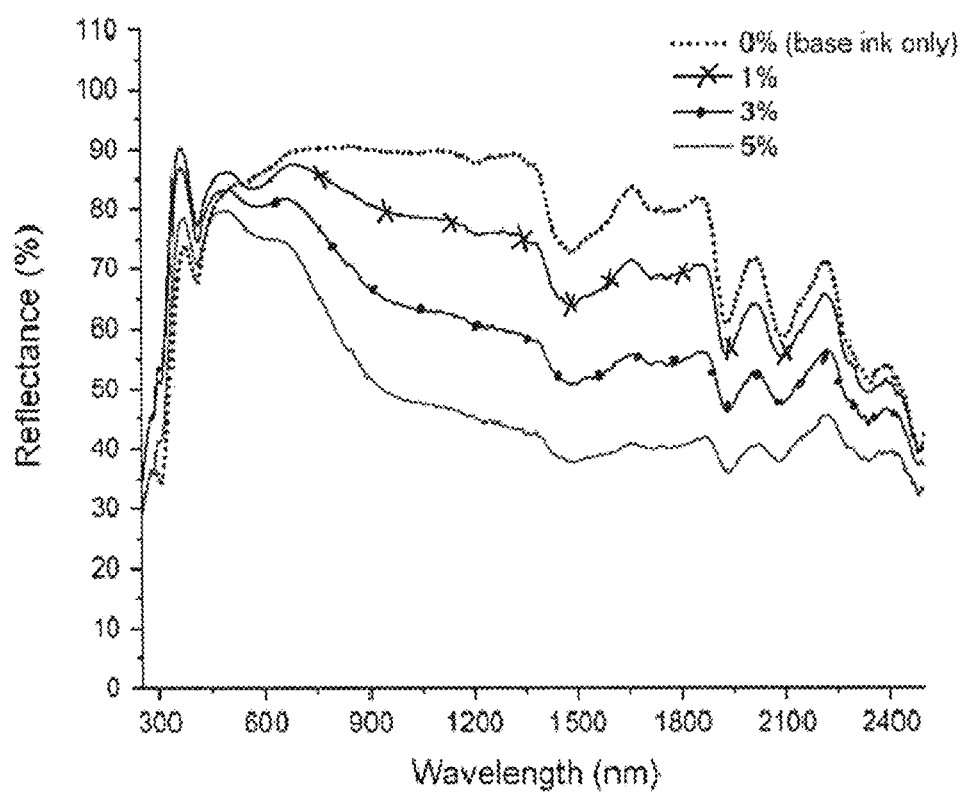
FIG. 2 shows the spectra for the ink comprising the material of the prior art.
Figure 3:
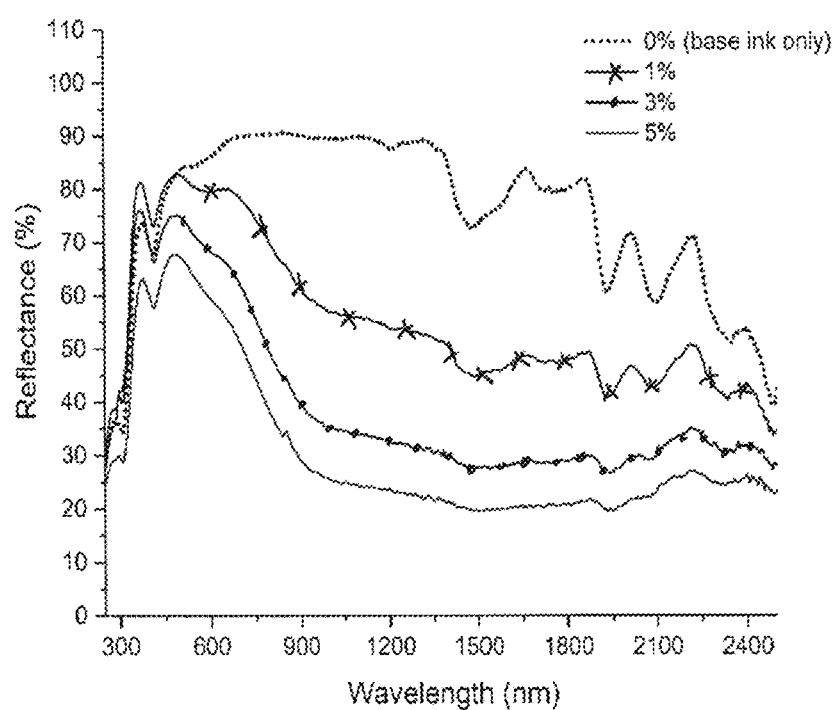
FIG. 3 shows the spectra for the ink comprising the material according to an embodiment of the invention.

The prints were dried and spectroscopically analysed. FIG. 2 shows the spectra for the ink comprising the material of the prior art. FIG. 3 shows the spectra for the ink comprising the inventive material.

It can be clearly seen that the organophosphorus tungsten oxide compound has a higher NIR absorption capability than the state of the art material. For example at 900 nm 5% of the prior art material resulted in an absorption of 60%, whereas the same amount of the inventive material resulted in a 75% absorption rate. At lower concentration rates the increase in NIR absorption is even bigger.

EXAMPLE 10

Figure 4:
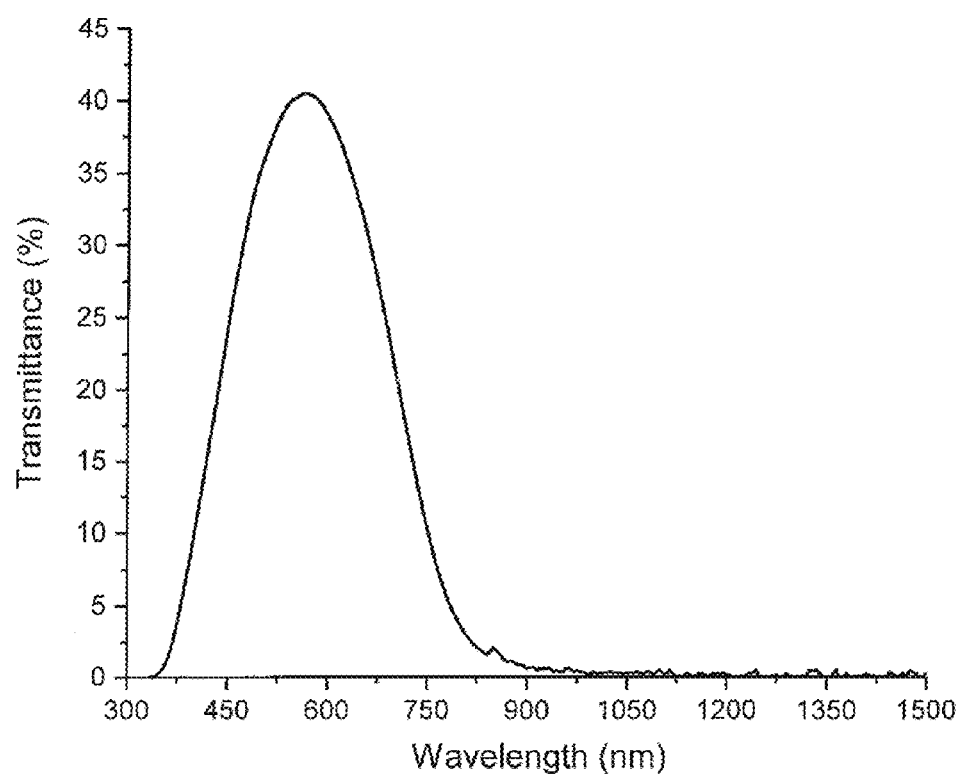
FIG. 4 shows the visible and infrared transmittance spectrum of a material according to an embodiment of the invention.

The organophosphorus tungsten oxide compound of example 7 was dispersed in an organic aliphatic solvent at a concentration of 1 wt %. The visible and infrared transmittance spectrum of this dispersion is shown in FIG. 4.

EXAMPLE 11

Ink compositions comprising 1, 3 and 5 wt % of the material of example 4 in organic solvents were prepared. These were printed onto standard printer paper and onto banknote paper. The infrared spectra of the prints were then recorded.

Figure 5:
FIG. 5 shows a photograph of ink compositions according to embodiments of the invention printed on banknote paper.

FIG. 5 shows a photograph of the prints on banknote paper. It can be seem that they are very light in colour.

Figure 6:
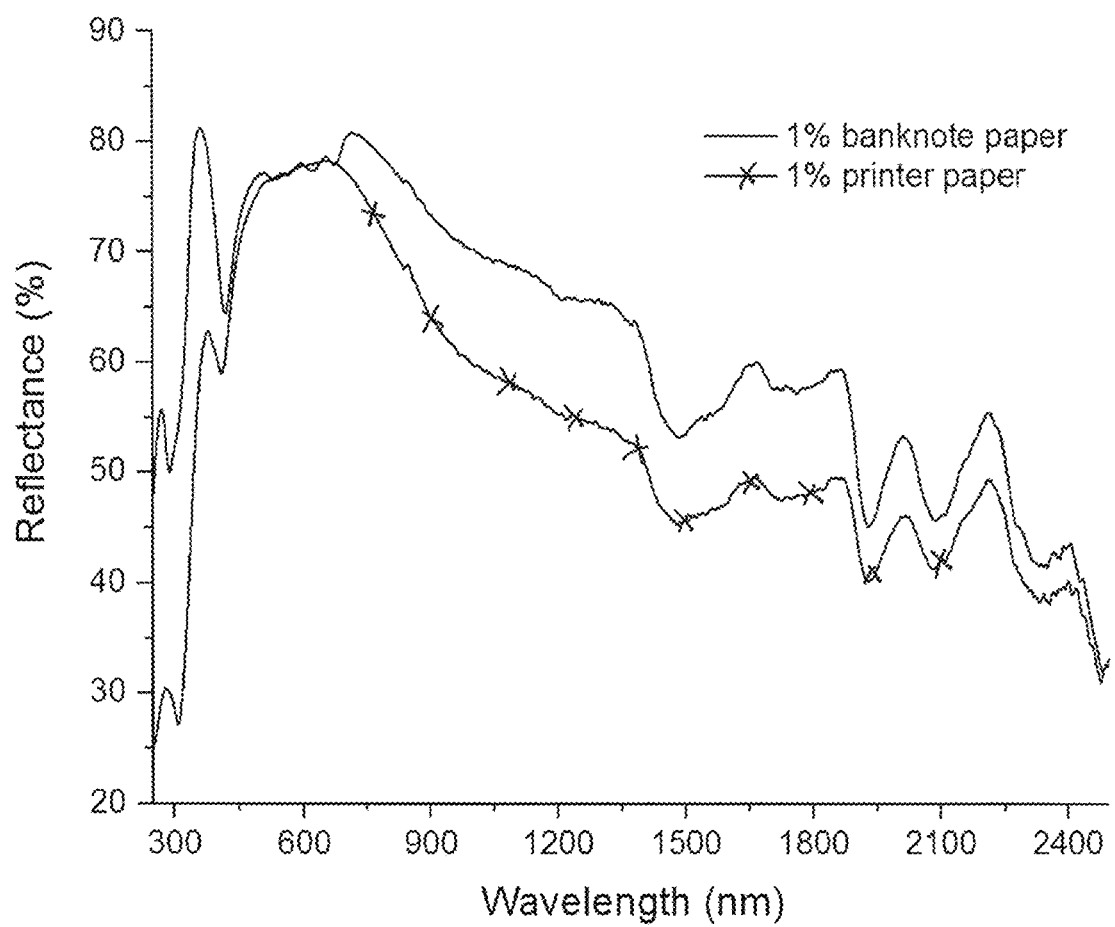
FIG. 6 shows the infrared spectra of prints comprising 1 wt % of a material according to an embodiment of the invention.

FIG. 6 shows the infrared spectra of the prints comprising 1 wt % of the material of example 4.

Figure 7:
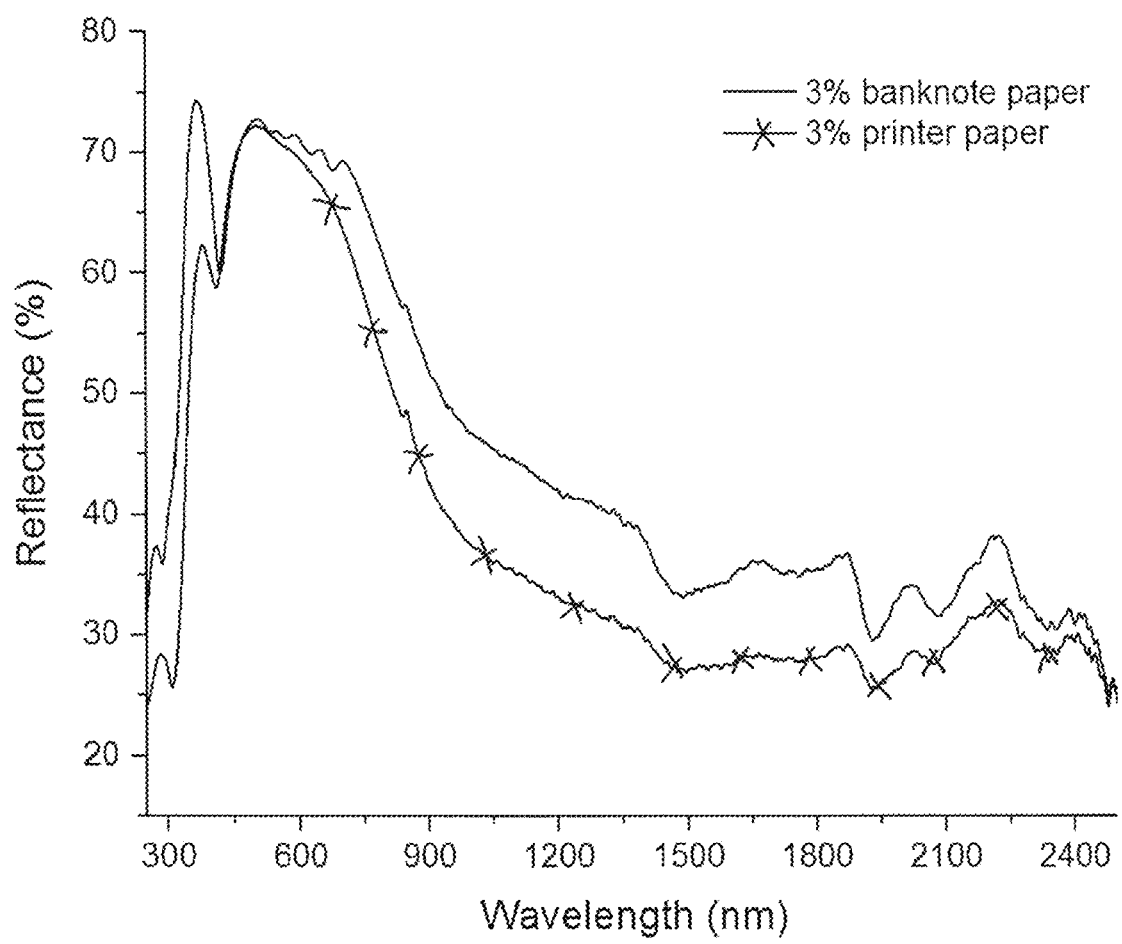
FIG. 7 shows the infrared spectra of prints comprising 3 wt % of a material according to embodiments of the invention.

FIG. 7 shows the infrared spectra of the prints comprising 3 wt % of the material of example 4.

Figure 8:
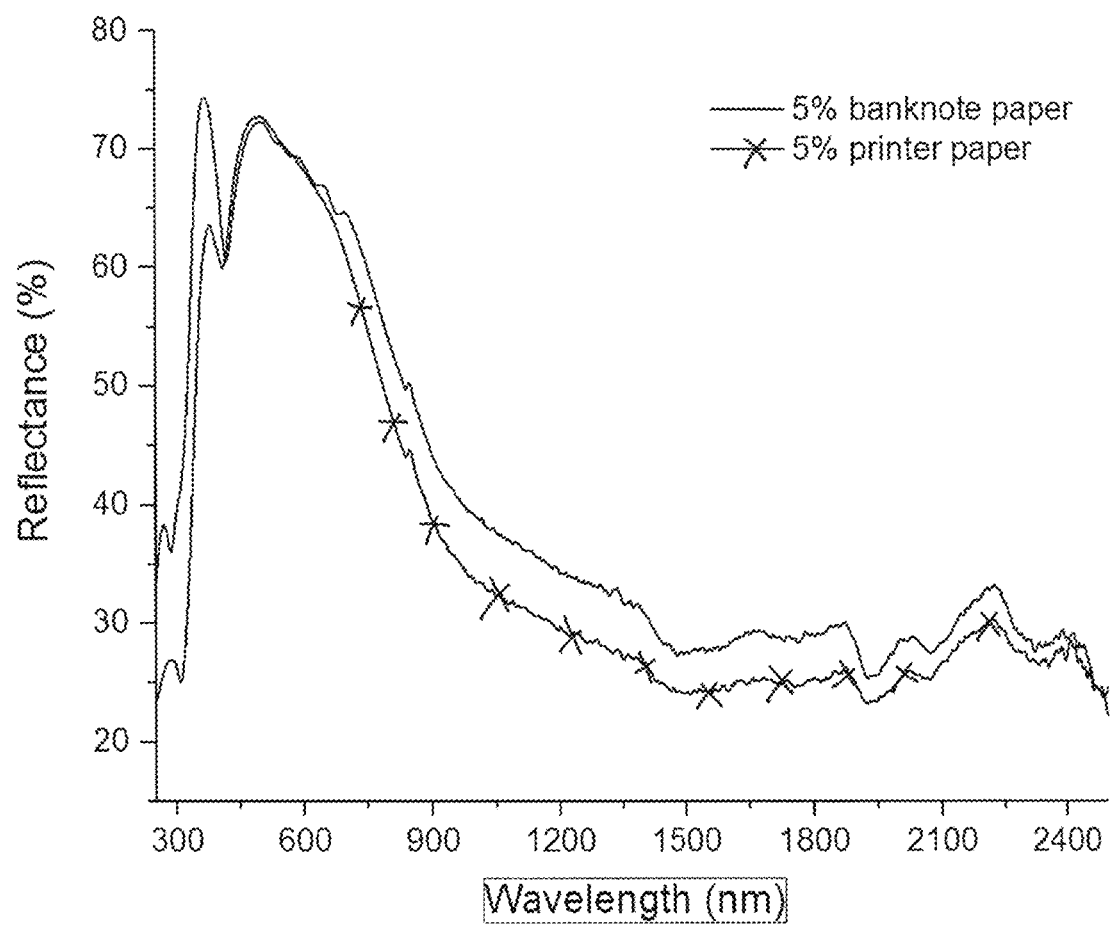
FIG. 8 shows the infrared spectra of prints comprising 5 wt % of a material according to embodiments of the invention.

FIG. 8 shows the infrared spectra of the prints comprising 5 wt % of the material of example 4.

The invention claimed is:

1. An article comprising a substrate which carries a material of formula (I)

$$M^1{}_a M^2{}_b W_c O_d (P(O)_n R_m)_e \qquad (I)$$

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group.

2. An article according to claim 1 which is a banknote.

3. An article according to claim 1 wherein $M^1$ is caesium; $M^2$ is selected from alkali metals, tin or zinc; a is 0.1 to 0.45; b is 0 to 0.3; c is 1; d is 2.7 to 3; e is 0.01 to 0.4; n is 2 or 3; m is 1 or 2 and each R is an unsubstituted alkyl or aryl group or an alkoxy group having 1 to 30 carbon atoms.

4. An ink composition comprising a material of formula (I)

$$M^1{}_a M^2{}_b W_c O_d (P(O)_n R_m)_e \qquad (I)$$

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group.

5. A method of manufacturing an article as claimed in claim 1, the method comprising incorporating a material of formula (I) into or onto the substrate.

6. A method according to claim 5 which comprises applying an ink composition comprising a material of formula (I) onto a surface of the substrate.

7. An article according to claim 1 wherein the difference in colour (dE) between the substrate with and without the material of formula (I) is less than 2.

8. A method of providing a covert security image or a hidden coating on a banknote, comprising applying to the banknote an ink composition comprising a material of formula (I)

$$M^1{}_a M^2{}_b W_c O_d (P(O)_n R_m)_e \qquad (I)$$

wherein each of $M^1$ and $M^2$ is independently ammonium or a metal cation; a is 0.01 to 0.5; b is 0 to 0.5; c is 1; d is 2.5 to 3; e is 0.01 to 0.75; n is 1, 2 or 3; m is 1, 2 or 3; and R is an optionally substituted hydrocarbyl group.

9. A method of detecting a genuine article of claim 1, the method comprising measuring at a locus on the article the absorption $A_1$, of radiation at a first wavelength $\lambda_1$, and the absorption $A_2$ of radiation at a second wavelength $\lambda_2$, and calculating the ratio of $A_1$ to $A_2$ wherein $\lambda_1$ and $\lambda_2$ are in the infra-red range.

10. A method of assessing the quality of an article of claim 1, the method comprising measuring at a locus of the article which carries a coating or an image of a material of formula (I), the absorption $A_1$, of at least one wavelength of $\lambda_1$ of radiation in the infra-red range and comparing the absorption with a standard.

* * * * *